United States Patent
Sakarda et al.

(10) Patent No.: US 7,571,295 B2
(45) Date of Patent: Aug. 4, 2009

(54) MEMORY MANAGER FOR HETEROGENEOUS MEMORY CONTROL

(75) Inventors: Premanand Sakarda, Acton, MA (US); Todd Brandt, Phoenix, AZ (US); Hai Hua Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 11/196,959

(22) Filed: Aug. 4, 2005

(65) Prior Publication Data

US 2007/0033367 A1   Feb. 8, 2007

(51) Int. Cl.
*G06F 13/14* (2006.01)
(52) U.S. Cl. .................. 711/165; 711/154; 711/170; 713/100
(58) Field of Classification Search ............. 711/170, 711/154, 165; 713/100
See application file for complete search history.

(56) References Cited

U.S. PATENT DOCUMENTS

| | | | |
|---|---|---|---|
| 7,159,096 B2 * | 1/2007 | Khan et al. ............. | 711/206 |
| 2005/0060514 A1 * | 3/2005 | Pomaranski et al. ....... | 711/202 |
| 2005/0091456 A1 * | 4/2005 | Huck ...................... | 711/118 |
| 2005/0185604 A1 * | 8/2005 | Agarwal ................ | 370/299 |
| 2005/0235110 A1 * | 10/2005 | Mylly ...................... | 711/115 |
| 2007/0022217 A1 * | 1/2007 | Ayres et al. ............. | 709/247 |

* cited by examiner

*Primary Examiner*—Tuan V Thai
*Assistant Examiner*—Yong Choe
(74) *Attorney, Agent, or Firm*—Blakely, Sokoloff, Taylor & Zafman LLP (57) ABSTRACT

Embodiments of a method and system for heterogeneous memory control are disclosed. The embodiments include components of a Memory Manager that receive usage information of a memory subsystem of a host system, the memory subsystem including internal memory and external memory. The Memory Manager also receives client information of one or more clients that are coupled to and/or integrated with the host system. A request or call for internal memory is also received at the Memory Manager from the clients. The Memory manager automatically controls the memory in accordance with one or more of the request, the usage information and the client information. The control includes allocating a portion of the internal memory to the client, remapping one or more areas of internal memory from a first client to a second client, and/or reorganizing the memory by remapping external memory to internal memory. Other embodiments are described and claimed.

14 Claims, 6 Drawing Sheets

MEMORY MANAGER FOR HETEROGENEOUS MEMORY CONTROL

BACKGROUND

Processor systems can include memory subsystems made up of diverse types of memory, such as internal/external cache, internal static random access memory ("SRAM"), external synchronous dynamic random access memory ("SDRAM"), and Flash memory, to name a few. While these different memory types have heterogeneous properties in areas like performance, power, and size, many operating systems ("OSs") do not provide any inherent support for these different memory subsystems. Consequently, applications, drivers, and OS kernels of these processor systems are pre-configured at runtime with pre-configured memory policies to use only fixed types of memory. The pre-configured solution might not be the best, as for example, when performance sensitive applications would benefit from use of faster memory and/or a higher priority role in cache occupancy. The pre-configured solution might also adversely impact system performance where a power sensitive application might benefit from use of low-power memory. This lack of inherent support for diverse memory subsystems therefore prevents many applications and Independent Software Vendors ("ISVs") from effectively exploiting optimizations in memory performance, power, and space.

DETAILED DESCRIPTION

A Memory Manager for heterogeneous memory control is described that allows applications, drivers, and/or operating system kernels to effectively use internal memory as appropriate to the application, driver, and/or OS kernel. The Memory Manager is a component that integrates with the OS, applications/drivers, and memory subsystem of a host processing system to control usage of the internal memory. The Memory Manager manages the host system internal memory to save space in memory, and optimize performance/power as appropriate to an application currently running on the system processor. The Memory Manager of an embodiment does not require the applications, drivers, and/or operating system kernels to have knowledge of the processor memory architecture. The Memory Manager thus provides systems and methods for software control of system-level memory optimizations, in contrast to typical methods of memory optimization through hardware implementation of single or multiple levels of cache.

In the following description, numerous specific details are introduced to provide a thorough understanding of, and enabling description for, embodiments of the Memory Manager. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
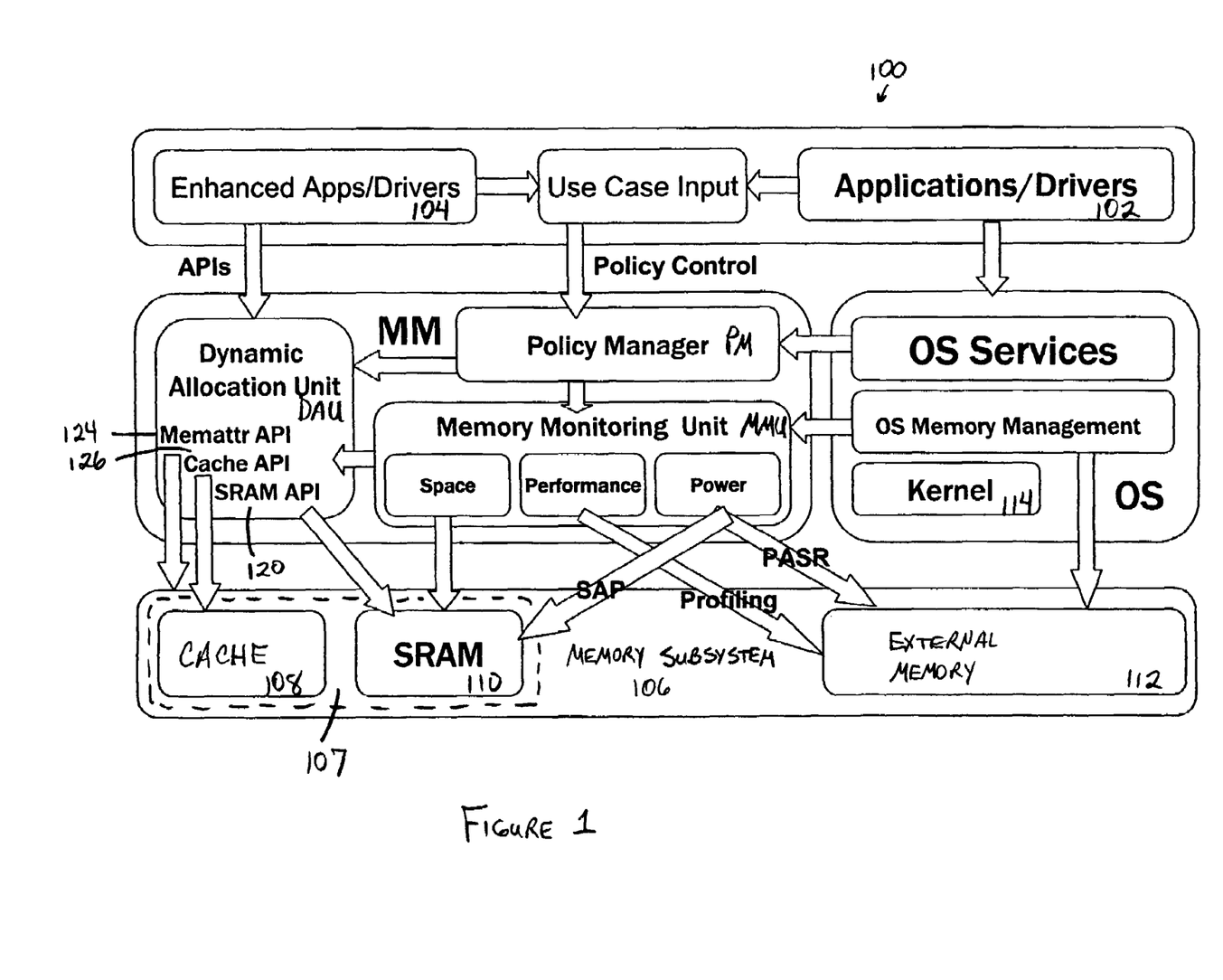
FIG. 1 is a block diagram of a Memory Manager ("MM") integrated in a host processing system, under an embodiment.

FIG. 1 is a block diagram of a Memory Manager ("MM") integrated in a host processing system 100, under an embodiment. The host processing system 100 (also referred to as "host system 100") includes but is not limited to an OS, applications/drivers 102, enhanced applications/drivers 104 ("enhanced apps/drivers 104"), and a memory subsystem 106 that includes one or more of internal memory 107 (e.g., cache 108 (for example level 2 cache ("L2")), SRAM 110, etc.) and external memory 112 (e.g., "SDRAM"). The Memory Manager MM as described in greater detail below integrates with various components of the host processing system 100 and provides heterogeneous memory control that allows the applications/drivers 102, enhanced applications/drivers 104, and/or OS kernels 114 to effectively use internal memory 107 as appropriate to the applications/drivers 102, enhanced applications/drivers, 104, and/or OS kernel 114.

The Memory Manager MM components include a Policy Manager ("PM"), Memory Monitoring Unit ("MMU"), and Dynamic Allocation Unit ("DAU"), but are not so limited. The PM collects information and instructions from the MMU and one or more clients 102 and 104 (e.g., applications, drivers) of the host processing system 100. The MMU detects status of the host processing information and provides information of the status to the PM. The PM uses the collected information and instructions to control an effective allocation of internal memory 107 of the host processing system 100 as appropriate to the memory architecture and the applications currently active. The PM provides instructions to the DAU to control the internal memory 107. The components of the MM are described in greater detail below.

The DAU provides information (e.g., a list) of optimized interfaces of the host processor memory subsystem 106, such as SRAM allocation, cache locking, page attribute change, partial array self refresh ("PASR"), etc. A DAU control interface (FIG. 6) is also included to receive instructions from applications and/or the PM. The Memory Manager MM of an embodiment may be integrated into an OS kernel 114 and interface with enhanced applications/drivers 104 and the OS kernel 114, but is not so limited.

The actual configuration of the Memory Manager MM is as appropriate to the components, configuration, functionality, and/or form-factor of the host system 100; the couplings shown between the Memory Manager MM and components of the host system 100 therefore are representative only and are not to limit the system 100 and/or the Memory Manager MM to the configuration shown. The Memory Manager MM can be implemented in any combination of software algorithm(s), firmware, and hardware running on one or more processors, where the software can be stored on any suitable computer-readable medium, such as microcode stored in a semiconductor chip, on a computer-readable disk, or downloaded from a server via a machine-readable medium and stored locally at the host device on a computer-readable medium, for example.

While components of the Memory Manager MM and/or host system 100 may be shown as co-located, the embodiments are not to be so limited; the Memory Manager MM of various alternative embodiments may distribute one or more functions among any number and/or type of components, modules, and/or circuitry of the host system 100. The Memory Manager MM may couple among components of the host system 100 under program or algorithmic control. Alternatively, various other components of the host system 100 may couple to the Memory Manager MM. These other components may include various processors, memory devices, buses, controllers, input/output devices, and displays to name a few.

The host system 100 includes one or more processors (not shown) and other components appropriate to a processing system distributed in a variety of fixed or configurable architectures. The host system 100 may be a component of and/or hosted on another processor-based system. Components of the host system 100 may be coupled through a wired or wireless network(s) to other processors and/or resources not shown. Various alternative embodiments of the host system 100 may include any number and/or type of the components shown coupled in various configurations. Further, while the Memory Manager MM and components of the host system 100 are shown as separate blocks, some or all of these blocks can be monolithically integrated onto a single chip, distributed among a number of chips or components of a host system, and/or provided by some combination of algorithms.

The term "processor" as generally used herein refers to any logic processing unit, such as one or more central processing units ("CPU"), digital signal processors ("DSP"), application-specific integrated circuits ("ASIC"), etc. While the term "component" is generally used herein, it is understood that "component" includes circuitry, components, modules, and/or any combination of circuitry, components, and/or modules as the terms are known in the art.

Figure 2:
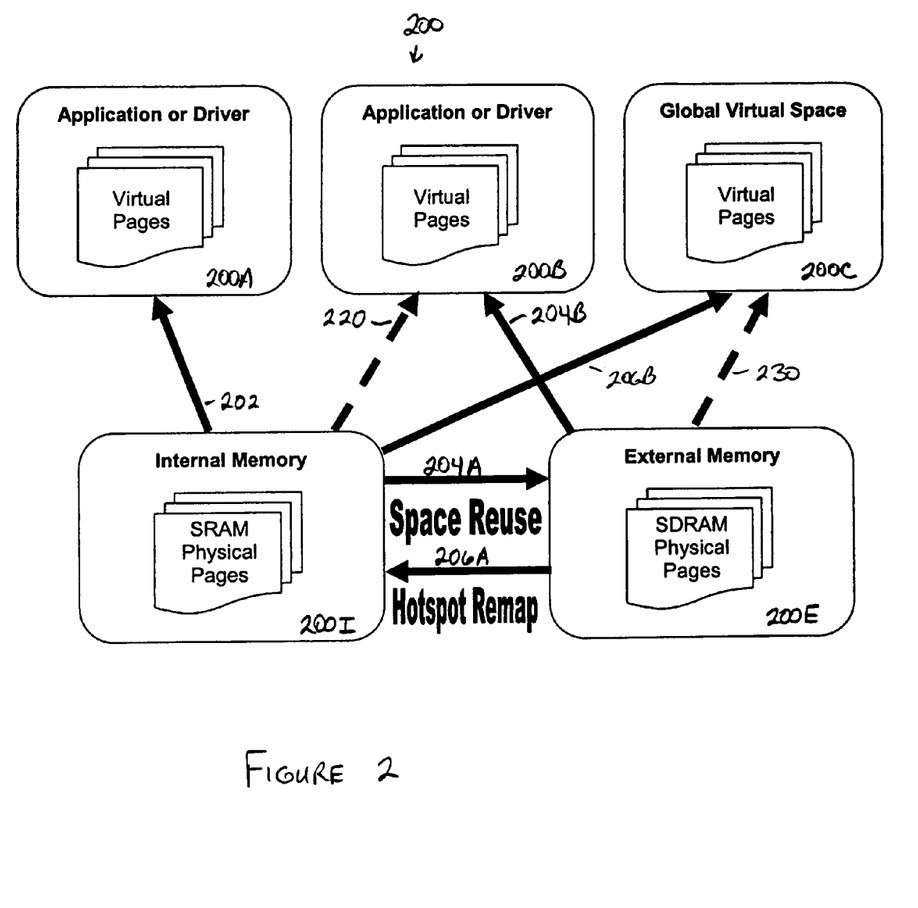
FIG. 2 is a block diagram of internal memory control operations of a Memory Manager, under an embodiment.

FIG. 2 is a block diagram of internal memory control operations 200 of a Memory Manager MM, under an embodiment. The memory control operations 200 of an embodiment include providing an interface by which clients (e.g., application, drivers, etc.) can access and allocate 202 areas or memory locations in internal memory (e.g., SRAM). The memory control operations also include temporary remapping 204A of allocated internal memory during inactive periods of currently-active clients in order to allow temporary reuse of the internal memory by other clients while supporting 204B the currently-active clients during inactive periods with external memory. The memory control operations further include automatic memory reorganization that remaps 206A highly accessed external memory to internal memory in response to excessive numbers of cache misses to the external memory and thus supports 206B the global virtual space with internal memory.

With reference to FIG. 1 and FIG. 2, the Memory Manager MM allows applications and/or drivers 200A of a host processing system to access internal memories 200I of a memory subsystem by providing an interface by which the applications/drivers 200A can access or request 202 internal memories 200I. The internal memories 200I supported include but are not limited to SRAM, cache, low locality of reference ("LLR") and/or mini-data ("Mini-D") cache, and cacheability properties for any block of virtual memory. The Memory Manager MM provides one or more interfaces as described herein that allow applications and drivers to allocate space in the various internal memories 200I.

The applications and/or drivers that are aware of the Memory Manager MM interfaces are referred to herein as "enhanced applications and/or drivers" but are not so limited. The Memory Manager MM interfaces may be components of the DAU but are not so limited. The enhanced applications/drivers link to a library of the Memory Manager MM using information of a received header file, and use information of the library to link to the DAU. Following linking of applications/drivers 200A to the DAU, components of the DAU are called by the application/driver 200A and provide the calling application/driver 200A with access 202 to internal memory 200I by performing one or more of storing information of the call, allocating SRAM or cache memory to the calling application/driver, and creating virtual memory for the kernel layer that maps directly to the allocated SRAM.

The DAU therefore provides to the calling application/driver 200A an interface to internal memory 200I and maps in a separate virtual memory into the calling application/driver space. As such, calls for internal memory allocation (SRAM allocation) by the application/driver 200A result in the DAU mapping unused pages of internal memory (SRAM) into the calling application/driver virtual space (pages). The DAU therefore enables developers to optimize their code by organizing their most highly used data into blocks of internal memory. The interfaces of the DAU also allow developers to modify the cache properties of blocks of internal memory by changing the Page Table Entry ("PTE") values.

The Memory Manager MM also provides temporary remapping 204A of allocated internal memory 200I to external memory 200E during inactive periods of an active client 200B. The active client 200B is mapped 220 to the internal memory 200I during active periods. The temporary remapping 204A allows for temporary reuse of the internal memory 200I by another client, while providing the active client 200B with memory 200E via the remapped 204B internal memory (remapped 204B to external memory).

The Memory Manager MM, while providing an interface to internal memory, also conserves internal memory space by keeping track of the drivers and/or applications not currently in use. Specifically, when an application is context switched out or a driver goes into idle, the internal memory of the application/driver is no longer being used. Components of the Memory Manager MM integrate with the operating system so as to be notified on these events, and take action by temporarily remapping 204A the allocated internal memory 200I to external memory 200E. This allows active applications and/or drivers to reuse the space in internal memory 200I.

Following is an estimation of memory space savings for a number of mobile handset use cases. Typical internal memory (SRAM) requirements of a number of use cases include: digital still camera (182 K), MP3 playback (52 K), video playback (256 K), video teleconferencing (246 K), home video recording (172 K), and 3-dimensional graphics (232 K); the total system requirements for internal memory in support of these applications would be approximately 844 K. Because none of these use cases will likely ever occur in parallel with each other, the Memory Manager MM of an embodiment remaps internal memory for all but the current use case. Thus the total system internal memory requirement would drop to approximately 256 K (largest requirement of any one use case, video playback), or 30% of the total use requirement (844 K).

The Memory Manager MM intelligently controls how the provided optimizations are best used by adapting them to a current use case. The Memory Manager MM changes the allocation priorities for drivers and applications targeted in the use case to allow them full access to internal memory resources. For example, if the current use case is video capture, the Memory Manager MM would give the camera and display drivers (e.g., liquid crystal display ("LCD") drivers) the highest access priority, with other clients using video decode having relatively lower access priorities. All other applications and/or drivers would be allowed internal memory space only if adequate memory space remained for the requesting application/driver. If the remaining internal memory space is inadequate, the internal memory allocations for a requesting application/driver are temporarily relocated to SDRAM.

In addition to providing developers with the capability to optimize their code separately, the Memory Manager MM of an embodiment also provides a mechanism to optimize system memory performance as a whole. The memory control operations optimize system memory performance using automatic memory reorganization that remaps 206A global virtual space 200C (e.g., kernel memory) from highly accessed external memory 200E to internal memory 200I in response to excessive numbers of cache misses to the external memory 200E. The global virtual space 200C is typically mapped 230 to the external memory 200E. The MMU of the Memory Manager MM is used to identify pages of memory that are the target of excessive cache misses (referred to herein as "hotspots"). The MMU performs hotspot remap operations that hotswap 206A identified hotspots from relatively slower external memory 200E to higher-speed internal memory 200I. As a result of the hotswap 206A the global virtual space 200C is mapped 206B to internal memory 200I. The hotspot remap operations 206A and 206B can reduce the miss penalty in a host processing system. The performance benefit of hotspot remap operations 206A and 206B can be estimated to provide a performance increase that is 45% of that provided by L2 cache for example. Therefore, the use of hotspot remap operations 206A and 206B as a substitute for hardware cache provides approximately half of the performance benefit of a cache without the additional power and die size associated with the cache.

An example of a client (e.g., application, driver) using the Memory Manager MM to improve memory performance includes a video playback/recorder application. There are several performance-sensitive buffers in a video codec that can result in many data cache misses. The DAU for example allows for placement of these buffers in relatively faster internal memory (e.g., SRAM) instead of the external memory (e.g., SDRAM) where they are typically placed. The SRAM access provided to the application by the DAU reduces cache misses as a result of the reduced latency of the on-chip SRAM when compared to the latency of the SDRAM (e.g., on-chip SRAM latency is approximately 40% of SDRAM latency on Intel® PXA27x-based platform). The memory performance improvements realized using the DAU are not limited to video playback and/or video recording applications.

An example of a client (e.g., application, driver) using the Memory Manager MM to improve power consumption includes an application for playback of Moving Picture Experts Group ("MPEG") audio layer 3 files ("MP3 files"). Generally, MP3 playback would put code and data buffers on SDRAM, however run-time SRAM power consumption is approximately 1% of SDRAM. In contrast, the DAU of the Memory Manager MM allows the application to specify for the code and data buffers to be placed in SRAM and the songs to be placed in flash memory, thus enabling the maximum level of PASR. The memory performance improvements realized using the DAU are not limited to audio/video playback applications.

Figure 3:
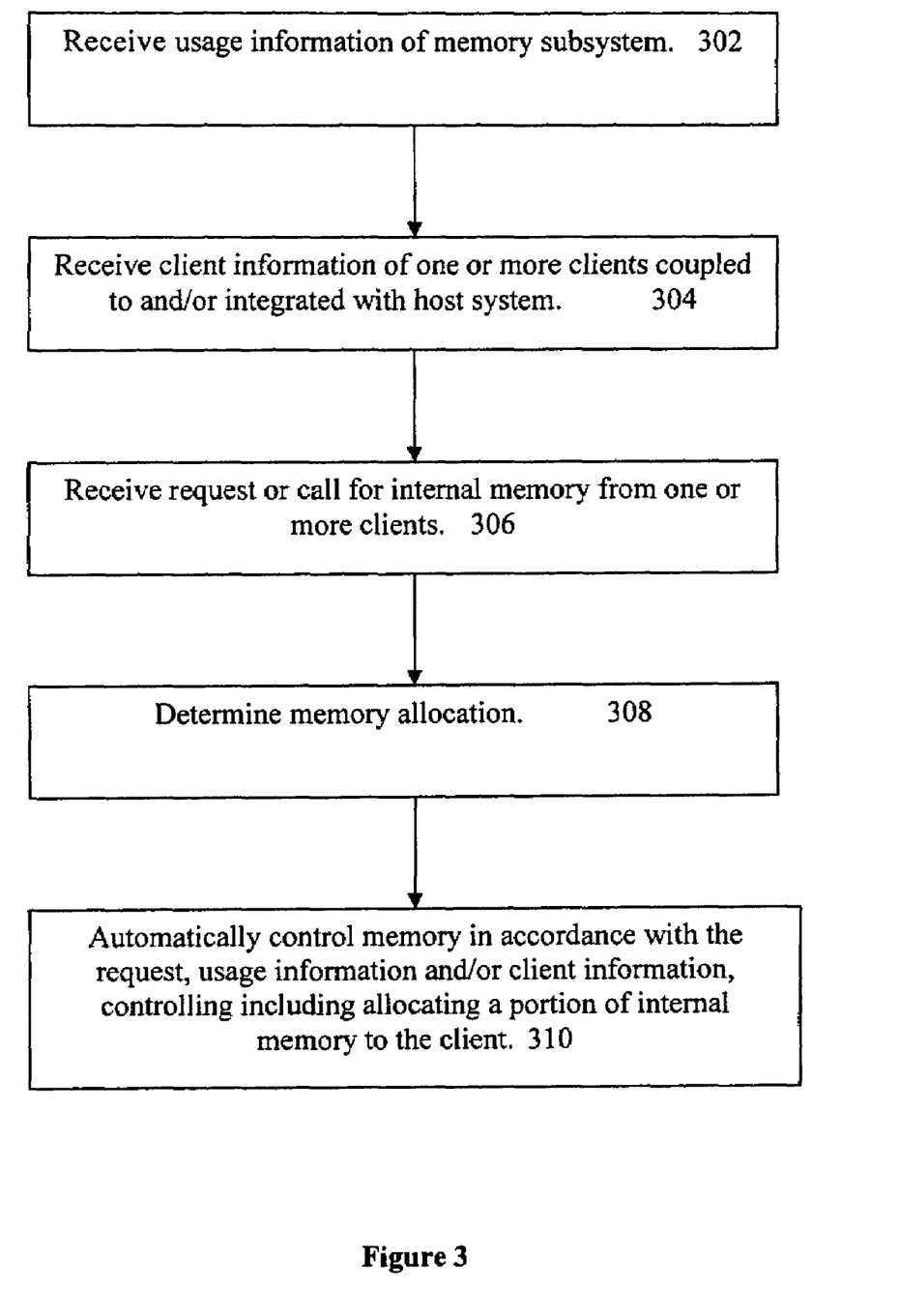
FIG. 3 is a flow diagram for managing system memory, under an embodiment.

FIG. 3 is a flow diagram 300 for managing system memory, under an embodiment. Components of the Memory Manager as described herein receive 302 usage information of the memory subsystem of a host processing system. The usage information of an embodiment includes information of how and to which clients memory is allocated, but is not so limited. The memory subsystem, also referred to as "memory," includes internal memory and external memory, and can be any of a number of memory types and/or combinations of memory types, but is not so limited. The Memory Manager also receives 304 client information of one or more clients that are coupled to and/or integrated with the host system. The client information can include a variety of information of the client; for example, client information of an embodiment includes information of an activity state of the client (e.g., state information of an active state and/or an inactive state of the client), but is not so limited. A request or call for internal memory is also received 306 at the Memory Manager from one or more of the clients.

Using information of the received usage information 302, the received client information 304, and/or the request 306, the Memory Manager MM determines 308 an allocation of the memory (e.g., internal memory), but the embodiment is not so limited. The Memory Manager MM automatically controls 310 the memory in accordance with the request, the usage information and/or the client information, wherein controlling includes allocating a portion of the internal memory to the client. The controlling 310 can also include remapping one or more areas of internal memory from a first client to a second client. Furthermore, the controlling 310 can also include reorganizing the memory by remapping external memory to internal memory.

Figure 4:
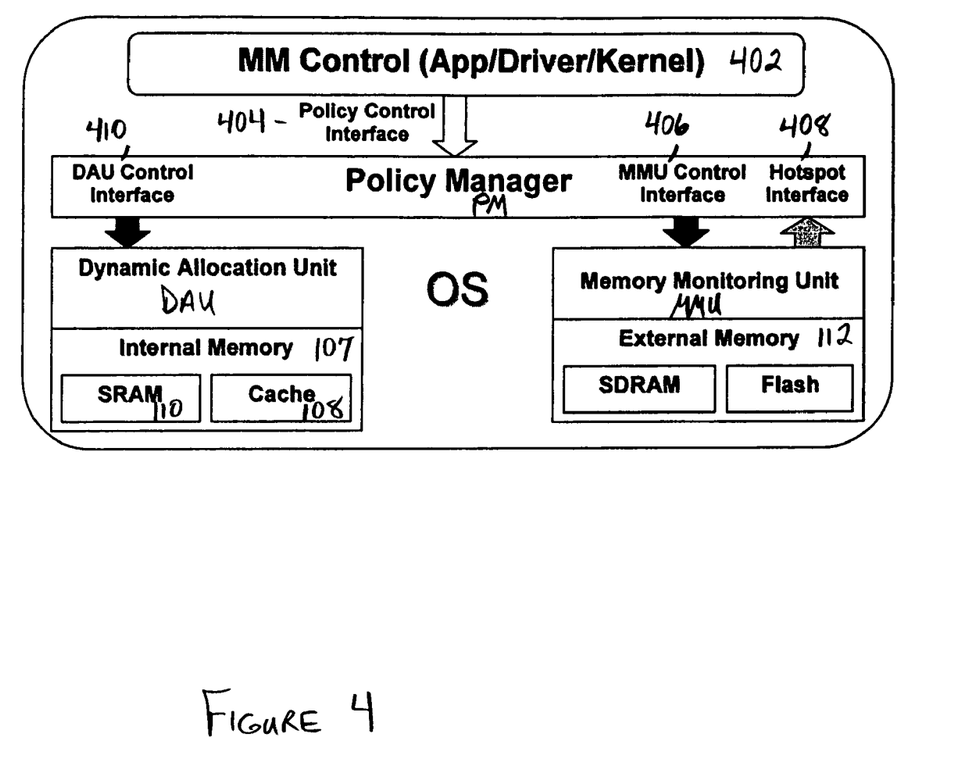
FIG. 4 is a block diagram of a Memory Manager including a Policy Manager ("PM"), under an embodiment.

Components of the Memory Manger MM as described above in FIG. 1 include a PM. FIG. 4 is a block diagram of a Memory Manager MM including a PM, under an embodiment. The PM of an embodiment determines the current use case and configures other modules of the Memory Manager MM as appropriate to the current use case. The PM also interfaces with the OS kernel in order to carry out automatic optimizations for performance, power, and space to name a few. The PM can receive user input from a Memory Manager Control 402 ("MM Control (app/driver/kernel)" 402) via a Policy Control Interface 404. Based on user input and pre-configured parameters, the PM transfers MMU parameters through the MMU Control Interface 406 to request memory hotspot data. The PM can receive hotspot information from the MMU through the Hotspot Interface 408 on the fly.

The PM also can identify the clients (e.g., applications, drivers) needing priority based on information of a preset internal policy algorithm. In response to information of the preset internal policy algorithm, the PM transfers instructions to the DAU through DAU Control Interface 410 in order to specify a particular memory operation.

Figure 5:
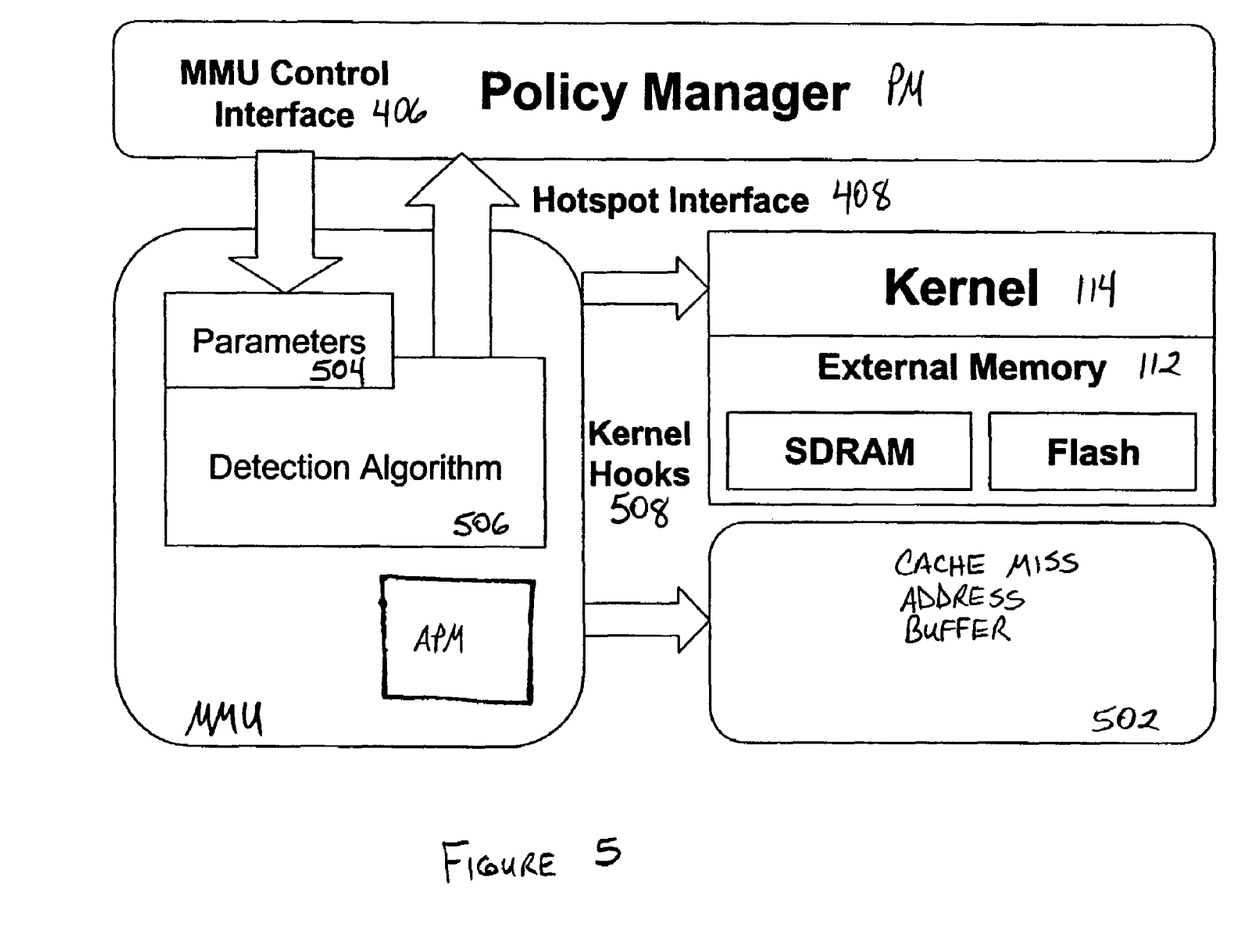
FIG. 5 is a block diagram of a Memory Manager including a Memory Monitoring Unit ("MMU"), under an embodiment.

The Memory Manager MM also includes an MMU as described herein. FIG. 5 is a block diagram of a Memory Manager MM including an MMU, under an embodiment. The MMU monitors memory usage by periodically gathering information of cache misses from one or more cache miss address buffers 502. The cache miss address buffers 502 of an embodiment include a number of entries "X". The information of cache misses includes addresses of memory transactions going out on a host system bus for which the memory transaction "missed" the target cache. The MMU also receives parameters 504 for a detection algorithm 506 of the MMU. The parameters 504 are received from the PM via the MMU Control Interface 406 and include read frequency, listening window length, miss depth, and miss threshold to name a few.

The MMU uses information of cache misses to associate the pages of memory that were the targets of the cache misses, and uses statistics specified by the PM via the parameters 504 to determine if the target pages are hotspots. Information of detected hotspots is sent to the PM as they occur within page boundaries. The MMU provides the hotspot information to the PM through a Hotspot Interface 408. The MMU of an embodiment provides information to the PM including page wise hotspot and cache miss count information, but is not limited to providing only this information.

Figure 6:
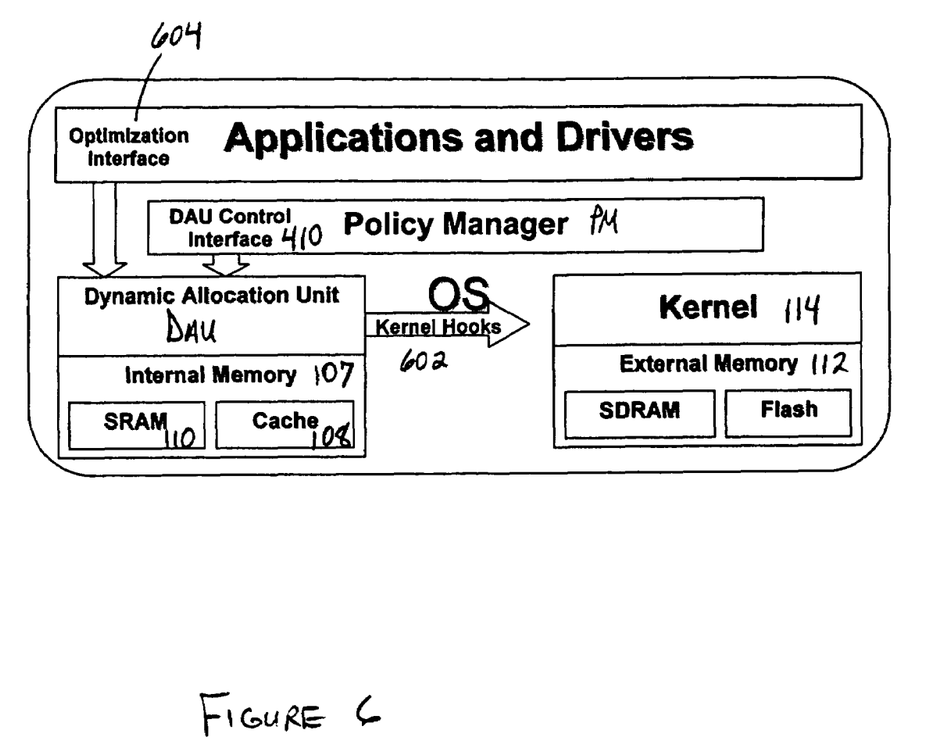
FIG. 6 is a block diagram of a Memory Manager including a Dynamic Allocation Unit ("DAU"), under an embodiment.

As described above the Memory Manager MM of an embodiment includes a DAU in addition to the PM and MMU. For example, FIG. 6 is a block diagram of a Memory Manager MM including a DAU, under an embodiment. The DAU provides a cross-platform interface to internal memory 107 that allows client developers complete access to internal memory 107 (e.g., SRAM and available caches) of the host system or platform 100. The DAU carries out actions involving system memory as directed by the PM. The DAU further allows clients (e.g., applications, drivers) of the host processing system access to internal memory 107. The DAU can change the page properties of a region of memory, allocate new internal memory, lock code or data into cache, and swap external memory to internal memory or vice versa as described herein.

The DAU, with reference to FIG. 1 and FIG. 6, includes one or more of a SRAM Allocation Application Programming Interface ("API") 120 (also referred to as "SRAM API" 120), Cache Locking API 122 (also referred to as "Cache API" 122), and Page Attribute Change API 124 (also referred to as the "Memory Attribute API" 124 or "Memattr API" 124). The DAU uses the SRAM API 120, Cache API 122, and Memattr API 124 to provide features that include but are not limited to client registration/client release, SRAM allocation/free, cache locking/unlocking, page attribute change, hotswap between SRAM and SDRAM, and PASR enable/disable. The DAU implements various ones of these features via calls to OS kernel hooks 602.

In providing client (e.g., applications, drivers) registration, applications are registered with the DAU (transparently) on the first call to the Memattr API 124, Cache API 122, and/or SRAM API 120. The registration sets the application identification ("ID") (referred to herein as the "Memory Manager ID" or "MMID") to the process ID ("PID") of the client process. When the registering client is a host system driver, the driver registers prior to any DAU usage and is assigned a unique MMID. Both application and driver IDs are passed to the DAU with every call the client makes to the DAU. An internal database of the Memory Manager MM stores related information based on the client ID.

The SRAM API 120 of the Memory Manager MM makes available relatively faster, power saving SRAM 110 to clients having special performance and/or power requirements. In response to calls to memory by these clients the SRAM API 120 of an embodiment maps space in unused pages of SRAM 110 into the calling client's virtual space. The allocation information of the calling clients is maintained in the internal database of the Memory Manager MM. Additionally, the SRAM API 120 allows powering down of memory that is not in use by clients.

The Cache API 122 of the Memory Manager MM supports cache including physically tagged L2 cache as well as other cache types. The DAU maintains an internal database of the locked cache of a client, and cache lock/unlock operations refresh information of the internal database as described below.

The Memattr API 124 provides clients the capability to set/change page attributes in corresponding process address space through the DAU Optimization Interface 604. The involved process address space includes L1/L2 cacheability, low locality of reference ("LLR") or mini-data ("Mini-D") cacheability, write-back/write-through policy, etc.

The DAU of an embodiment receives instructions from Memory Manager-enabled applications/drivers or the PM through one of a number of control interfaces that include a configurations interface, SRAM hotswap/SDRAM hotswap interface ("hotswap interface"), and PASR interface. The configurations interface allows clients or the PM to configure the DAU. As such the configurations interface provides for setting maximum amounts of SRAM and L2 cache that can be allocated or locked by the program interface. The configurations interface also enables automatic defragmentation of SRAM allocations.

The configurations interface can also be used to select the allocation priority of specific drivers and/or applications, or specific sets of drivers and/or applications. In this way, when there is contention for internal memory and cache in a host system, the Memory Manager MM can choose to provide temporary external memory (e.g., SDRAM) (which is relatively slower but more plentiful) to low priority applications and/or drivers, and internal memory (e.g., SRAM, cache) to high priority applications and/or drivers. The priorities can be changed on the fly as well if a new use case comes into play so that the most heavily used drivers and applications can have their priorities elevated so that they receive internal memory.

The hotswap interface allows the allocated SRAM of a client to be remapped ("hotswapped") to SDRAM on the fly ("SRAM-to-SDRAM hotswap"). This SRAM-to-SDRAM hotswap saves SRAM space and provides more efficient use of a size-limited system resource. The hotswap interface also supports on-the-fly remapping of a client's allocated SDRAM (DDR) to SRAM ("SDRAM-to-SRAM hotswap"). This SDRAM-to-SRAM hotswap can be used to decrease power usage by the memory subsystem or increase the performance of pages of memory. The DAU maintains an internal database of hotswapped SDRAM and whole of SRAM.

Many SDRAM subsystems include power saving features such as PASR. The PASR allows for placement of unused portions of SDRAM into self-refresh mode. The DAU of an embodiment (e.g., SRAM API) determines the current memory usage (e.g., SDRAM memory map in use) by interfacing with the OS kernel. The DAU uses the information of current memory usage to dynamically control the SDRAM without any additional information from the OS. For example, the DAU controls the PASR of the SDRAM to power down unused portions of SDRAM or otherwise place the unused portions in a lower power mode in order to save power.

In further describing the PM, and with reference to FIG. 1 and FIG. 4, the PM tracks the drivers/applications connected to the Memory Manager MM, routes kernel hooks to each module of the Memory Manager MM, initializes each of the modules, and handles error reporting. The PM of an embodiment locally stores the characteristics of the various memory components of a memory subsystem. Each processor of a host system sets up its hardware characteristics in this store. The characteristics can include SRAM size, number of SRAM arrays, maximum amount of cache that is allowed to be locked through the cache API, and size of coupled SDRAM chips along with the level of PASR supported.

Regarding client registration, each Memory Manager client, whether it is an application or a driver, has a unique identification (MMID) attached to it for organization purposes. The PM maintains a list of attached clients by their client identification MMIDs. Prior to usage, driver clients call a function that returns the corresponding MMID. This MMID is then passed with subsequent API calls.

Application clients go through the Memory Manager device driver interface to access the Memory Manager, thus their registration occurs behind the scenes. The Memory Manager device driver calls a function, passing it the process ID ("PID") of the process and the start address of where the Memory Manager device driver memory has been mapped into the process's address space. The MMID for application clients is thus set to the PID of the process.

The MMID list is a global list that stores client information about each client with regard to all of the modules. Memory Manager modules can get access to the client information through a call to the MMID list, the call including an MMID. This way, applications and drivers can call functions supplied in other Memory Manager source files, and each of these files can retrieve the data for the client by calling a single retrieval function.

The PM provides an initialization function that is called by the Memory Manager during system start. The PM initialization function or interface when called initializes each Memory Manager module and provides the modules access to the native information interface of the OS which allows direct communication with the user (for statistical printouts, test hooks, etc.).

The PM provides a kernel hook function attached to one or more of a task start kernel hook, a task exit kernel hook, a task context switch kernel hook, and a driver unload kernel hook. Modules of the Memory Manager that need to be notified of an active process or a process exit put their function calls in these kernel hooks.

Referring to error handling, the PM includes a function that is called by the Memory Manager modules whenever they produce an error that is to be passed to a user. The PM also includes a function that is called by either an application or driver to retrieve the last known error string.

In further describing the MMU, and with reference to FIG. 1 and FIG. 5, the MMU of an embodiment includes an Auto Power Module ("APM"). The APM determines the current memory usage through kernel hooks 508 into the OS kernel 114.

The APM uses information of the memory configuration to reconfigure the memory prior to entry into a low-power mode. Consequently, the APM controls the last few instructions prior to entering and prior to exiting low power modes. The APM reconfigures the memory by moving all contents of memory to an area of memory below the appropriate PASR boundary for the amount of memory used. The APM then places the memory subsystem in standby or shutdown mode. When the memory subsystem comes back to full power mode, the APM controls the reboot process to put memory back into the original state prior to entering the full power mode.

The APM monitors memory usage in external memory 112 (e.g., SDRAM) and internal memory (e.g., SRAM) and takes advantage of memory architectural features like PASR to conserve power for standby and sleep modes. The PASR allows software to save power by selectively shutting off unused portions of memory in low power modes. Chipsets supporting PASR support self-refresh in the following proportions: the entire memory is placed in a low power mode, the first one-half of memory is placed in a low power mode, and the first one-quarter of memory is placed in a low power mode.

In a processing environment that includes Linux for example, the APM includes a component for determining the physical memory usage map, and a component for compression/decompression of used memory before/after low power mode entry. Linux stores the information about memory usage in a "zone list," and there are three zones: DMA, Normal, and Highmem. For some processors these zones all contain portions of the physical memory map resident on the external memory (e.g., DRAM chips). Each zone has a list of free memory regions called a "free list".

The APM component for determining the physical memory usage map loops through each zone and each of the corresponding free lists and compiles a complete list of the physical memory designated as free by the Linux kernel; it is assumed that all memory falling outside of these regions is used. From the total number of used pages it is known what the PASR boundary can be after compression. The compression component of the Memory Manager moves used page blocks (e.g., 4 K page blocks) from the dead side of memory (the part of memory that will be powered down or lost during PASR) to unused blocks on the live side of memory (the part of memory that will be state-retained during PASR).

When the system is about to enter a low-power state, the APM determines the PASR boundary and generates a bitmap of the pages to be moved. Information of the PASR boundary and bitmap are used to carry out the actual compression of memory contents and the system enters the low power state. On return to the powered state, the APM decompresses the compressed memory contents using information of the PASR boundary and bitmap and the system is returned to a working state.

In reconfiguring the memory for power conservation, the APM completely flushes the L1 and L2 data caches to the external memory immediately after memory compression and decompression. Further, the APM switches the current page table with a PASR-safe page table that is located in physical memory that is below the PASR boundary. The switch to the new PASR-safe page table occurs immediately before compression, and the old table is restored immediately after decompression. Further, the APM controls the host system so that no code executing creates or accesses memory that is above the PASR boundary between a time when the APM begins the process to determine the PASR boundary and generate a bitmap of the pages to be moved and completion of decompression of the memory contents. Additionally, the APM creates an area of memory in immobile kernel memory for a PASR-safe stack so that, when the original stack data is temporarily lost during PASR, functions can still be called prior to memory decompress.

Switching of the MMU to a new page table located in physical memory below the PASR boundary uses the kernel page table, which is located 4 K from the start of physical external memory. This kernel page table includes the necessary mappings, for external memory (e.g., dynamic random access memory ("DRAM")), input/output ("IO"), interrupt vectors, and cache flush memory because it is used as the template for process page tables. The function that determines the PASR boundary is called with the current page table since all tables map kernel memory. The compression function however first switches to the kernel table before moving any memory. The decompression function switches the page table back upon completion of decompression.

As described above, and with reference to FIG. 1 and FIG. 6, the DAU includes a SRAM API 120, Cache API 122, and Memattr API 124 but is not limited to including only these components. The SRAM API 120 provides the allocation interface for internal SRAM 110 and maintains internal lists of all allocated virtual blocks and the physical SRAM pages underneath the virtual blocks. The SRAM API 120 provides an initialization function that creates a block of virtual memory that will be used by all drivers to access SRAM 110. This memory is created zero mapped, and each call to allocate SRAM 110 and release or free SRAM 110 will map and unmap SRAM pages into this virtual block, respectively.

In allocating SRAM 110, the SRAM API 120 includes functions to allocate SRAM 110 and to free SRAM 110. The function that allocates SRAM 110 is called by drivers to allocate SRAM memory. The Memory Manager device driver handles calls from user space. The size of the requested block is passed in the call, as well as the MMID of the requesting client. There are two flags that can be passed in the call. The first flag is a stub for future internal memory types. The second flag designates that the SRAM allocated is to be physically contiguous and immobile (i.e., can not be remapped behind the scenes).

The function that frees SRAM 110 is called by drivers to free a previously allocated block of SRAM memory 110. The SRAM address and the MMID of the client are passed in the call to free SRAM.

The function that frees SRAM 110 further includes a function to free SRAM upon client exit. This function is called by the PM and is triggered when a client exits in order to free all SRAM allocations associated with the exiting client.

In order for SRAM 110 to be allocated, the client has a block of unmapped virtual memory reserved for SRAM mapping. Clients that are drivers point to a single virtual memory block in kernel space. Clients that are applications each map a unique copy of the Device Driver memory into their address spaces. The Memory Manager MM includes a pointer to the start of the virtual memory block local to each associated client.

The virtual memory block starts out zero-mapped, so that a controlled error will occur if an application tries to overrun its allocated memory. Upon calling the SRAM allocation function, new SRAM pages are mapped into this virtual memory block as appropriate to the memory needs of the client.

In addition to the virtual memory start pointer, the Memory Manager MM includes a unique virtual allocation list, which records all the allocations that exist for a given MMID. A single physical allocation list is maintained for the entire SRAM array to keep track of which pages are mapped to which address.

The SRAM allocation function, when called, performs one or more of following (not limited to the order described herein):

1) Test requested size and flags for validity:
   a. if the size is less than pre-specified size "N", SRAM allocation call fails.
   b. if the size is greater than the total SRAM size, SRAM allocation call fails.
2) The information structure for the calling client is requested from the PM; if the information structure is not found, SRAM allocation call fails.
3) The client's virtual allocation list is traversed in order to find a contiguous virtual gap large enough to satisfy the allocation:
   a. new virtual allocations are placed immediately after existing ones so the possibility exists that a new allocation can border a previous allocation within a page boundary (i.e., share a physical page with an existing allocation). A page compatible function is called when this happens; if the new or existing allocation is hardware, the page compatible function fails and the search algorithm moves on to find another gap.
   b. if no gap can be found that is large enough to accommodate the new allocation, SRAM allocation call fails.
   c. to keep the possibility of a virtual allocation failure down, the virtual memory map in the clients address spaces is set to twice the size of SRAM.
4) When a virtual allocation is found, a page allocation function is called with the new virtual address range to allocate the physical pages underneath; the new virtual allocation is not committed until the virtual address range returns successfully:
   a. if the new allocation is not hardware, the page allocation function first finds all the pages that the new allocation shares with existing allocations, then starts from the first page and scoops up the first free physical pages it can find (even if not contiguous). If enough free pages cannot be found the page allocation function fails and the SRAM allocation call fails.
   b. if the new allocation is hardware, the page allocation function looks for the first contiguous block of unmapped SRAM pages that fit the size requirement; if a block meeting the size requirement cannot be found the page allocation function fails and the SRAM allocation call fails.
5) Once the SRAM pages are found, the allocation is approved. Each physical page is mapped to its corresponding place in the virtual allocation block.
6) After the page allocation function returns successfully, the new virtual allocation is committed and the SRAM allocation call returns successfully.

The SRAM free function, when called, performs one or more of following (not limited to the order described herein):
1) The information structure for the calling client is requested from the PM; if the information structure is not found, the SRAM free function fails.
2) The client's virtual allocation list is traversed in order to find the allocation requested; if the allocation is not found, SRAM free function fails.
3) The virtual allocation once found is removed from the virtual allocation list, and the free pages function is called to remove the physical memory underneath.
4) The free pages function loops through physical pages and unmaps any page it finds that is mapped, matches the target MMID, and is mapped within the requested virtual allocation range.
5) The SRAM free function returns success.

The function to free SRAM upon client exit, when called, performs one or more of following (not limited to the order described herein):
1) The information structure for the calling client is requested from the PM; if the information structure is not found, free SRAM upon client exit call returns.
2) The client's virtual allocation list is traversed, and for every virtual allocation it finds, it calls a Memory Manager free function.
3) The free SRAM upon client exit function returns.

The Cache API 122 provides the locking interface for cache 108. The Cache API 122 of an embodiment maintains internal lists of all locked ranges in cache, but is not so limited. The cache 108 of an embodiment includes L2 cache but is not so limited.

The Cache API 122 provides numerous functions in support of cache locking. A cache lock function locks a range of memory into cache. A first type of cache lock function applies to data while a second type of cache lock function applies to instructions. These two types of cache lock functions are used because data is flushed upon unlock, and instructions are invalidated.

Another function of the Cache API 122 is the cache unlock function. The cache unlock function is used to unlock a range of memory from cache that was previously locked with a cache lock function. The cache unlock MMID function is called from the PM. The cache unlock MMID function is triggered when a client exits in order to unlock the locked cache of the client.

Each Memory Manager information structure carries a unique cache lock list, which records all the locked ranges that exist for a given MMID.

The cache lock function, when called, performs the following but is not so limited:
1) The requested address, size, and flags are tested for validity:
   a. the target memory range is tested to see if it falls within the address space of the client; if not, cache lock function fails.
   b. if the size is greater than the remaining lockable cache space, cache lock function fails.
   c. if neither instructions nor data is selected, cache lock function fails.
2) The Memory Manager information structure for the calling client is requested from the PM; if the information structure is not found, cache lock function fails.
3) The client's lock list is traversed to see if the new lock range overlaps any existing lock range; if so, cache lock function fails.
4) A new lock range entry is created and the low level instructions are carried out to actually lock the memory.
5) The cache lock function returns success.

The cache unlock function, when called, performs the following:
1) The Memory Manager information structure for the calling client is requested from the policy manager; if the information structure is not found, cache unlock function fails.
2) The client's lock list is traversed to see if the lock range exists; if not, cache unlock function fails.
3) The lock range entry is removed and the low level instructions are carried out to unlock the memory.
4) The cache unlock function returns success.

The cache unlock MMID function, when called, performs the following:
1) The Memory Manager information structure for the calling client is requested from the PM; if the information structure is not found, cache unlock MMID function fails.
2) The client's lock list is traversed, and for every range found the cache unlock function is called.
3) The cache unlock MMID function returns success.

The Memattr API 124 of an embodiment provides the interface for changing the page attributes for a region of memory and retrieving PTE values for a given range of memory, where the PTE values are values in virtual memory page tables that describe how particular pages of memory are to be handled (e.g., cacheability, permissions, etc.). The Memattr API 124 includes a memory attribute function that, when called, performs but is not limited to the following:
1) The requested address, size, and flags are tested for validity; the target memory range is tested to see if it falls within the address space of the client; if not, memory attribute function fails.
2) The page tables are manually traversed to find the appropriate PTEs.
3) In order to screen out shared memory, the existing PTEs are tested to verify that they are set to the default PTE value (fully cacheable); if not, the memory is not changed and memory attribute function fails.
4) Each PTE value is changed to the new setting. No record is made of the change since this memory is purely virtual and will disappear on process exit. Drivers are trusted applications and are expected to return memory in the condition in which it was found.
5) The memory attribute function returns success.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), and machine-readable media include carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the Memory Manager are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A method for managing memory of a system, comprising:
    receiving client information of a plurality of clients of the system, the clients being programs that request use of the memory of the system, and the client information including state information indicating an active state or an inactive state of each client;
    receiving usage information of the memory indicating information about how memory is allocated to which clients, wherein the memory includes internal memory local to a processor of the system and external memory of the system separate from the internal memory;
    receiving a request for internal memory from at least one client; and
    automatically controlling the memory in accordance with the request, the usage information and the client information, wherein automatically controlling includes allocating a portion of the internal memory to the client, managing the memory of the system for performance, power, and space in accordance with a use case of the system, where the use case includes a function of the system for which the client performs an operation, and
    remapping an area of internal memory from a first client to a second client, wherein the remapping is temporary during at least one period of inactivity by the first client.

2. The method of claim 1, wherein the plurality of clients include clients selected from the group consisting of an application and a driver.

3. The method of claim 1, wherein allocating comprises allocating at least one available area of internal memory into virtual memory of the client.

4. The method of claim 1, wherein controlling further comprises reorganizing the memory by remapping external memory to internal memory.

5. The method of claim 4, wherein the reorganizing comprises receiving information of cache misses to the external memory and initiating the reorganizing when the cache misses exceed a pre-specified number.

6. A system comprising:
    a memory subsystem coupled to an operating system (OS), the memory subsystem comprising memory that includes internal memory local to a processor of the system and external memory of the system separate from the internal memory;
    a memory manager coupled to the memory subsystem, the memory manager configured to receive memory information including usage information of the memory indicating information about how memory is allocated to which clients, client information of at least one client responsive to the OS, the client being a program that requests use of the memory subsystem, where the client information includes state information indicating an active state or an inactive state of the client, and requests for internal memory from the clients, the memory manager automatically controlling the memory subsystem in accordance with the memory information, automatically controlling including allocating areas of the internal memory to requesting clients, managing the memory of the system for performance, power, and space in accordance with a use case of the system, where the use case includes a function of the system for which the client performs an operation, and remapping an area of internal memory from a first client to a second client, wherein the remapping is temporary during at least one period of inactivity by the first client.

7. The system of claim 6, wherein the memory manager comprises:
    a policy manager (PM) coupled to at least one component selected from the group consisting of the OS and the at least one client;
    a memory monitoring unit (MMU) coupled to at least one component selected from the group consisting of the PM, the OS, and the memory subsystem; and
    a dynamic allocation unit (DAU) coupled to at least one component selected from the group consisting of the PM, the MMU and the memory subsystem.

8. The system of claim 6, wherein the plurality of clients include clients selected from the group consisting of an application and a driver.

9. The system of claim 6, wherein allocating comprises allocating at least one available area of internal memory into virtual memory of at least one client generating the requests.

10. The system of claim 6, wherein automatically controlling farther comprises reorganizing the memory by remapping external memory to internal memory in response to a number of cache misses to the external memory exceeding a pre-specified number of cache misses.

11. A computer readable medium comprising executable instructions which when executed in a processing system manage memory of the system by:
    receiving client information of a plurality of clients of the system, the clients being programs that request use of the memory of the system, and the client information including state information indicating an active state or an inactive state of each client;
    receiving usage information of the memory indicating information about how memory is allocated to which clients, wherein the memory includes internal memory local to a processor of the system and external memory of the system separate from the internal memory;
    receiving a request for internal memory from at least one client; and
    automatically controlling the memory in accordance with the request, the usage information and the client information, wherein automatically controlling includes allocating a portion of the internal memory to the client, managing the memory of the system for performance, power, and space in accordance with a use case of the system, where the use case includes a function of the system for which the client performs an operation, and
    remapping an area of internal memory from a first client to a second client in response to at least one period of inactivity by the first client, wherein the remapping is temporary during the period of inactivity.

12. The computer readable medium of claim 11, wherein allocating comprises allocating at least one available area of internal memory into virtual memory of at least one client.

13. The computer readable medium of claim 11, wherein controlling further comprises reorganizing the memory by remapping external memory to internal memory.

14. The computer readable medium of claim 13, wherein the reorganizing comprises receiving information of cache misses to the external memory and initiating the reorganizing when the cache misses exceed a pre-specified number.

* * * * *